Figure 1:
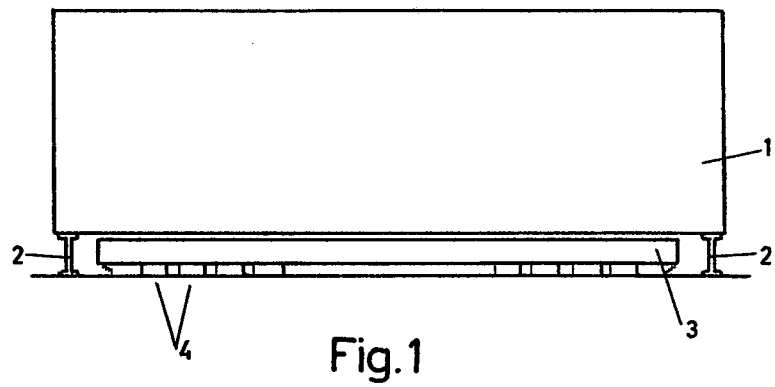

United States Patent [19]

Olér

[11] 3,946,823

[45] Mar. 30, 1976

[54] DRIVING AND STEERING DEVICE FOR A LOADING PLATFORM

[75] Inventor: Ernst Bertil Olér, Karlskoga, Sweden

[73] Assignee: AB Bofors, Bofors, Sweden

[22] Filed: Dec. 10, 1974

[21] Appl. No.: 531,421

[30] Foreign Application Priority Data

Dec. 21, 1973  Sweden .............................. 7317343

[52] U.S. Cl. ................... 180/23; 180/52; 180/119; 280/43.23
[51] Int. Cl.².... B60P 1/00; B62D 59/04; B60V 3/00
[58] Field of Search .............. 180/119, 23, 44 F, 52, 180/65 R, 45, 48, 42, 6.48, 12, 79.2 C; 280/43.23; 214/512

[56] References Cited
UNITED STATES PATENTS

| | | | |
|---|---|---|---|
| 1,106,217 | 8/1914 | Hoag..................... | 180/52 |
| 1,190,194 | 7/1916 | Schleicher ............ | 180/23 |
| 1,267,503 | 5/1918 | Blocher.................. | 180/52 |
| 3,154,162 | 10/1964 | McCaleb et al. .......... | 180/21 X |
| 3,280,931 | 10/1966 | Cahill et al. .............. | 180/23 |
| 3,404,746 | 10/1968 | Slay ........................ | 180/23 |
| 3,680,653 | 8/1972 | Murata et al. ............. | 180/23 |
| 3,693,741 | 9/1972 | Scheuerle ............... | 180/23 |

FOREIGN PATENTS OR APPLICATIONS 320,590  5/1970  Sweden............................. 180/79.2

*Primary Examiner*—Kenneth H. Betts
*Attorney, Agent, or Firm*—Elliott I. Pollock

[57] ABSTRACT

A low profile air cushion loading platform is provided with a driving and steering device comprising a plurality of laterally spaced steering boxes located under the platform. Each steering box includes a plurality of wheel members adapted to be driven by motors about horizontal axes of rotation, with the wheel members and their driving motors being located within a ball race and rotatable with said ball race as a unit about a vertical axis. The ball race has gear teeth which cooperate with a driving gear operated by an electrohydraulic steering system to rotate the ball races of different ones of the steering boxes through different angles respectively during the steering operation, to cause the wheel members of all the steering boxes to be driven along arcs having a common center of curvature.

7 Claims, 8 Drawing Figures

BELLOWS  AIR CUSHION

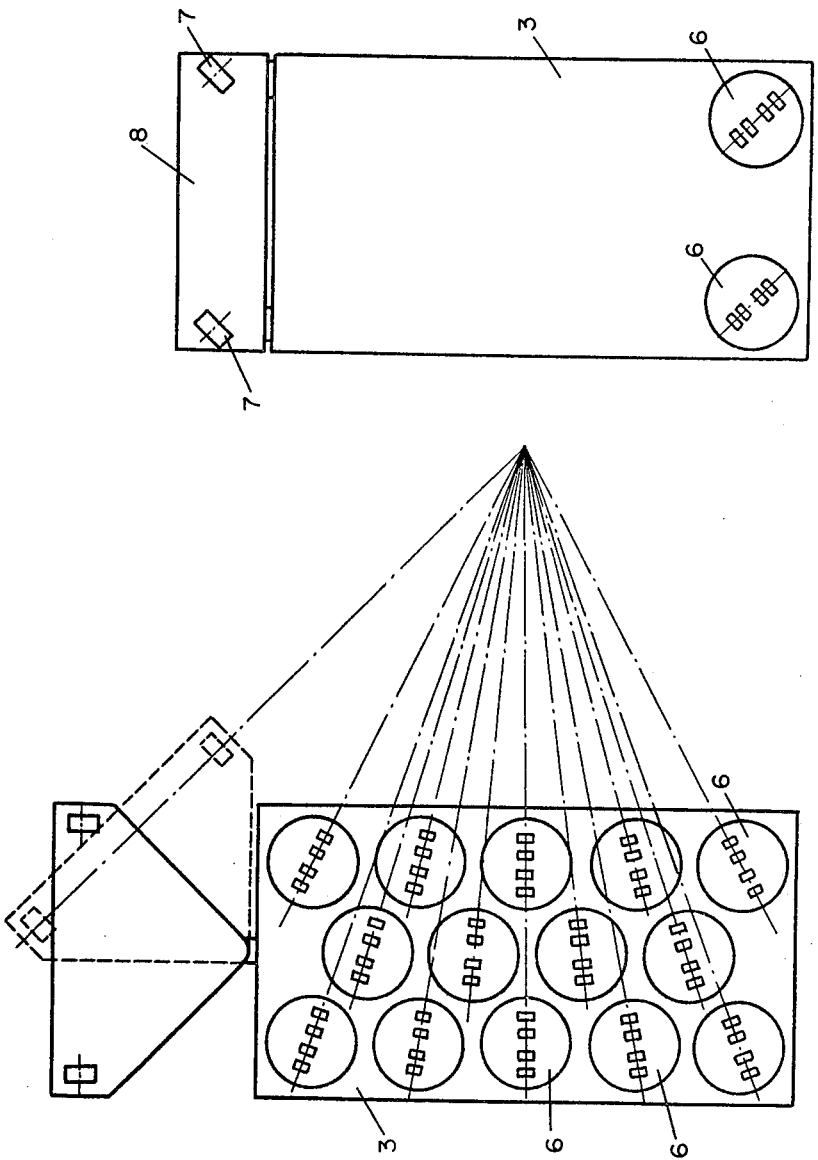

DRIVING AND STEERING DEVICE FOR A LOADING PLATFORM

The present invention relates to a driving and steering device for a low loading platform. The loading platform is particularly intended for use when handling containers in connection with container traffic.

In container traffic, it is of great importance that loading and unloading of the containers can take place quickly. Particularly in container traffic with ships, it is important that the waiting time for the ships in the harbours will be as short as possible. Loading and unloading each container individually with a truck or crane has proved to be altogether too time-consuming. Therefore, special loading platforms can be designed for handling several containers simultaneously. These loading platforms are given such a size that several containers can be placed in a row beside each other, and can also be stacked on top of each other. The purpose of these loading platforms is that it shall be possible to stack the containers in a goods terminal to a height corresponding to the cargo space in the ship, and thereafter move several containers simultaneously to the cargo space of the ship, without having to do any further stowing. In order to be able to utilize the height of the cargo space in the ship properly, the loading platform must be very low.

A method of lifting a loading platform of the kind mentioned above is based upon the air cushion principle. The advantage of such an air cushion platform is that it can be made very low, but can still be used for lifting big loads. However, a substantial drawback is the poor manoeuverability, which is particularly noticeable when loading and unloading ships, as there are then often height level differences and inclined surfaces that can cause the air cushion platform to slide off in the wrong direction.

The purpose of the present invention is therefore, for a low loading platform of the kind mentioned in the introduction, to achieve a driving and steering device which makes it possible to manoeuvre the platform on an uneven base and at junctions at ramps to ships and the like.

According to the invention, this is achieved by having one or several so-called steering boxes provided with wheels or driving tracks arranged under the loading platform in such a way that the wheels or driving tracks can be given a rotating movement for driving and a turning movement for steering. The steering of the loading platform and a possible unit for machinery and driver are co-ordinated particularly with an electrohydraulic steering system.

Figure 2:
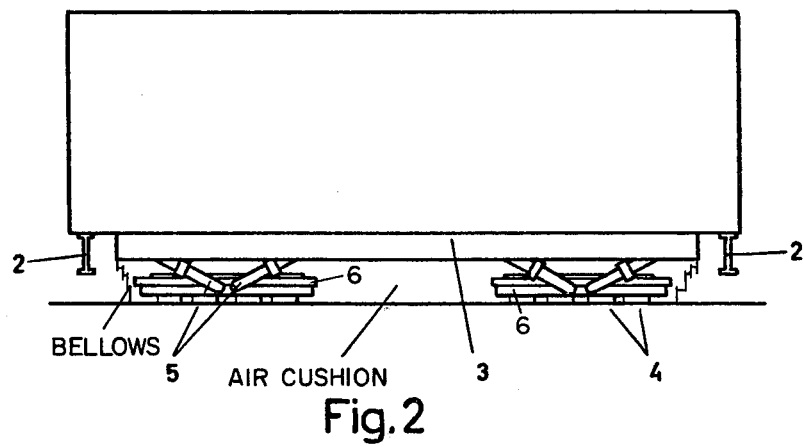
Figure 7:
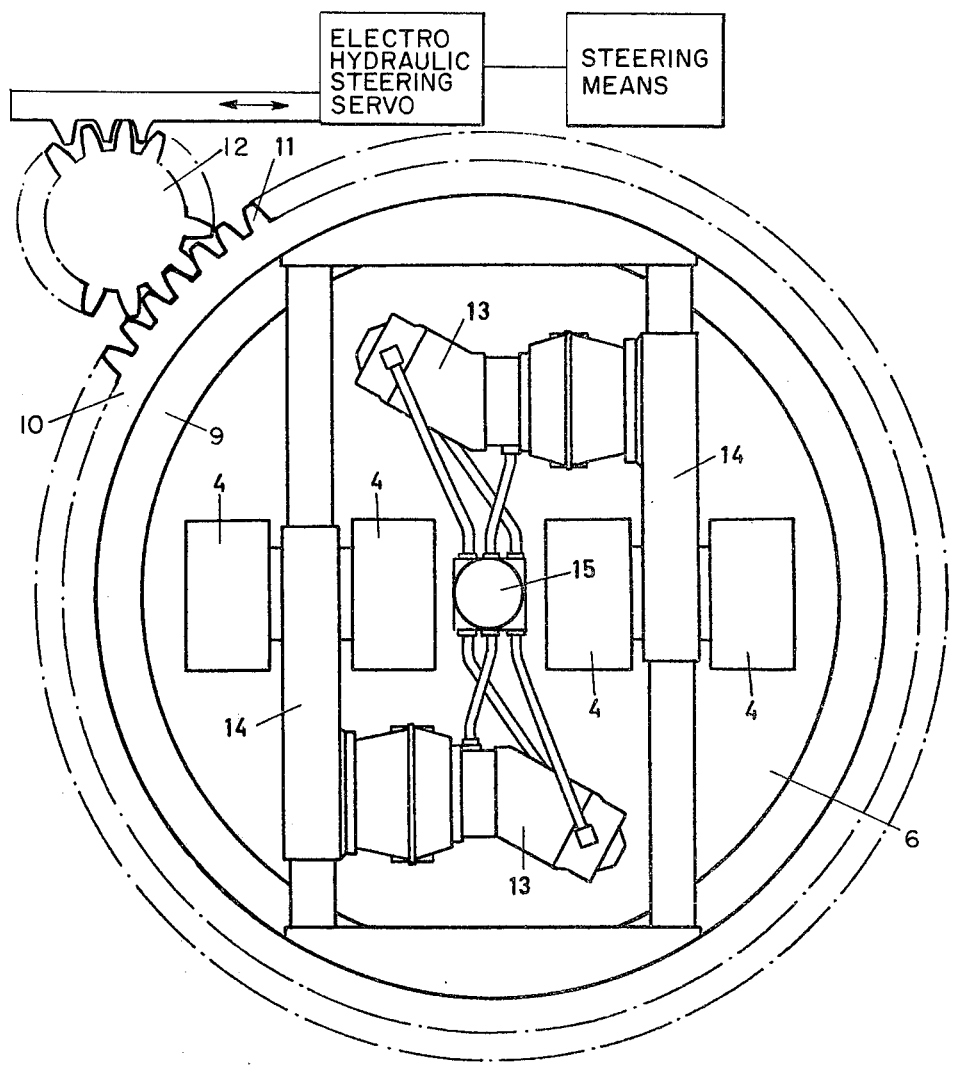
Figure 8:
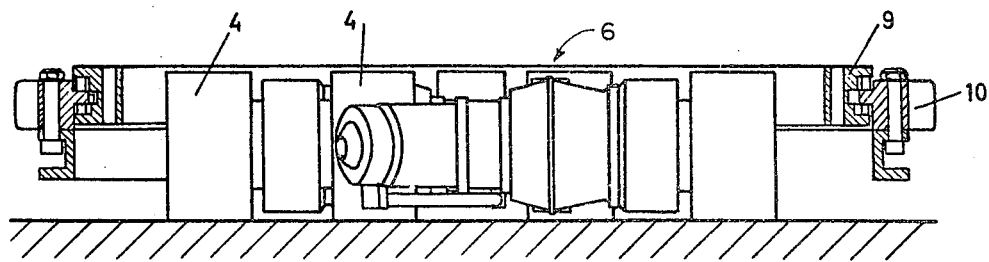

The present invention will be described in more detail with reference to the accompanying drawings, in which FIG. 1 shows the loading platform in its lower position, FIG. 2 shows the loading platform in its upper (raised) position, FIGS. 3–6 show examples of different forms of steering geometry for the loading platform, FIG. 7 shows the steering box viewed from above, and FIG. 8 shows the steering box viewed from the side.

Figure 4:
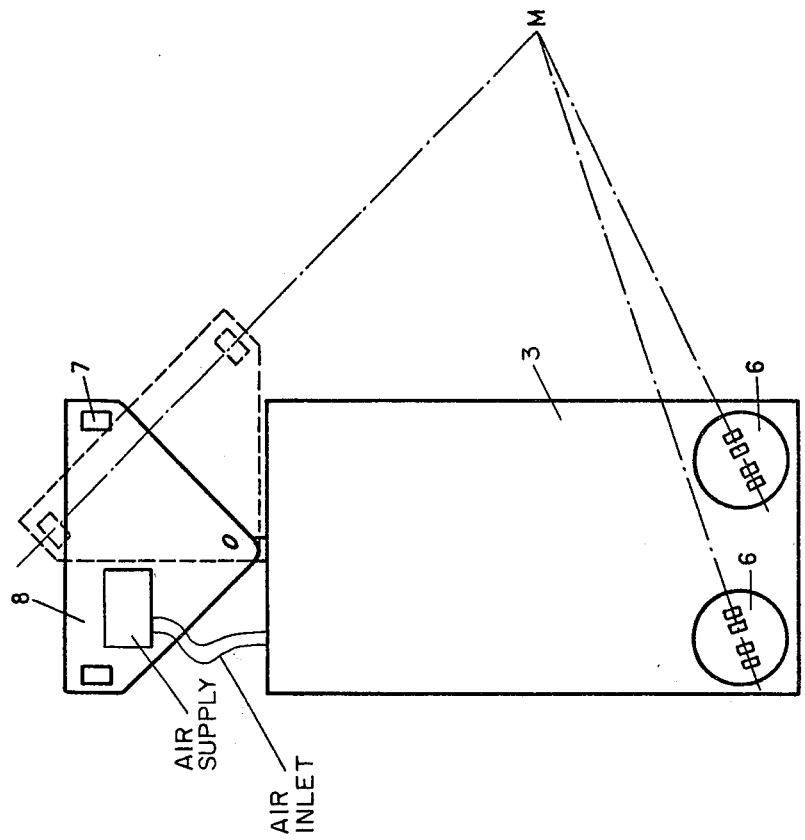
Figure 3:
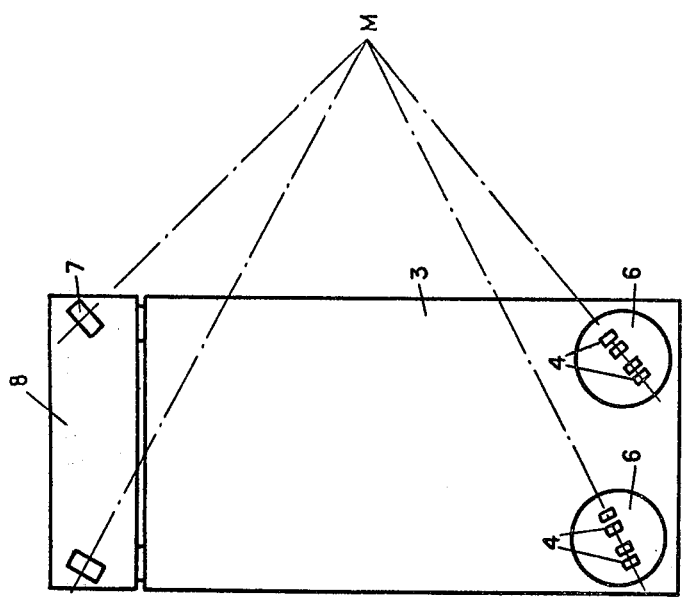

FIG. 1 shows schematically a load 1 placed on a carrying frame 2. The load can consist of several units, e.g. several containers, placed in a row or stacked upon each other. When these containers are to be moved, for instance when being loaded on board a ship, a low air cushion platform 3 is run into the space between the base and the load e.g. by supplying air from an air supply via an air inlet to the underside of platform 3 as depicted in FIG. 4. The air cushion platform can then either be connected to a towing vehicle or can be self-propelled. On the under side of the platform 3, one or several steering boxes 6 (see FIGS. 3–8) provided with wheels 4 for driving and steering the loading platform are arranged. In FIG. 1, which shows the loading platform in a lowered position, the wheels 4 can partly be seen, and it is assumed that each steering box 6 comprises four wheels.

FIG. 2 shows the loading platform in its raised position, and the load together with the carrying frame have then been lifted up from the base. In this position, the load is mainly supported by the air cushion generated by the loading platform and, in principle, it should be possible to do without the steering boxes 6 and the platform could be driven away by a towing vehicle. As previously mentioned, however, the manoeuvrability will be altogether too poor if such an air cushion platform is used, and there will be a risk that it will slide away on an inclined base. Therefore, the air cushion platform has been provided with steering boxes 6 which are provided with equipment 5 which presses the wheels 4 against the base and in this way compensates the unevenness of the base and junctions at ramps to ships and the like. The equipment 5 can consist of hydraulic pistons as shown in FIG. 2, or some mechanical spring device.

As shown in FIG. 2, the carrying frame 2 is made in such a way that it accompanies the load when this is lifted. This is an advantage, as at the unloading the load will automatically come to rest against the carrying frame when the load is lowered.

In order that it may be steered, the vehicle is provided with steering equipment that can be actuated by means of a steering wheel or a similar member for turning of the steering boxes around their vertical axes. The steering is particularly coordinated with an electrohydraulic steering system of the kind described in Swedish Pat. No. 320,590, assigned to the assignee of the instant invention and corresponding to Lindbom U.S. Pat. No. 3,532,178 issued Oct. 6, 1970, for "Vehicle Having Four Wheels Steerable About Associated Vertical Steering Axes," the disclosure of which is incorporated herein by reference. Such a steering system makes the loading platform easy to operate, even within the very limited surfaces on which the loading platform is to be manoeuvred. From FIG. 3 it will be noted that when the loading platform 3 is to be turned, the steering boxes 6 are set so that they describe circular arcs with a common center of curvature M. Also the wheels 7 of a possible separate towing unit 8 for machinery and driver are co-ordinated with the steering system, and describe arcs with the same center of curvature. FIG. 4 shows an alternative design of the separate towing unit 8. When the loading platform is to be turned, in this case the entire separate towing unit is turned around the vertical axis through the point 0 in the figure. The steering boxes 6 and the entire towing unit 8 are set in such a way that they describe arcs with a common center of curvature M.

FIG. 5 shows a similar embodiment in which, however, the loading platform 3 has been provided with a much greater number of steering boxes 6. As in the two embodiments described in the foregoing, at the turning of the loading platform, all of the steering boxes 6 are set to describe arcs with a common center of curvature.

FIG. 6 shows a further example of how the steering system can be co-ordinated with steering boxes 6 and the wheels 7 of the towing unit 8. In this case, all of the wheels have been set parallel to one another. The loading platform 3 can then be made to move along an arbitrary straight line, without any change of the orientation of the actual platform taking place.

FIGS. 7 and 8 show the design of the steering box 6. The steering box consists of a fixed part 9 and a rotatable part 10 which acts as a ball race and is provided with a gear arc 11 on its outer periphery. The ball race 10 is arranged to rotate around the center axis of the steering box with the aid of the gear wheel 12 which is in turn driven, as shown in FIG. 7, by an electrohydraulic steering system of the type described in aforementioned U.S. Pat. No. 3,352,178. The four wheels or driving tracks 4 of the steering box are placed within the ball race 10, which is provided with gear teeth 11. Each pair of wheels 4 is driven by a motor 13 via a gear box 14, and is connected to a swivel 15. It is an advantage to have the wheel axles designed in such a way that they balance the load if the base is uneven.

The invention is not limited to the embodiment shown above as an example, but can be varied within the scope of the following claims.

I claim:

1. In combination, a loading platform, a driving and steering device for said loading platform comprising a plurality of laterally spaced steering boxes arranged under the loading platform, each of said steering boxes including a plurality of wheel members disposed within a ball race, said wheel members being rotatable about horizontal axes and said ball race being rotatable with said wheels as a unit about a vertical axis, whereby said wheel members can be given a rotating movement for driving said loading platform and a turning movement for steering said loading platform, each of said steering boxes including motor means located within said ball race connected to said wheel members and movable with said unit about said vertical axis for selectively rotating said wheel members to drive said loading platform, gear teeth on said ball race, a driving gear in mesh engagement with said gear teeth, and an electrohydraulic steering system operative to rotate said driving gear thereby to rotate said unit through an angle about said vertical axis to steer said loading platform as it is driven by said wheel members.

2. The structure of claim 1 wherein said steering system is operative to turn the ball races of different ones of said steering boxes through different angles respectively to cause the wheel members of all of said steering boxes to be driven along arcs having a common center of curvature.

3. The structure of claim 1 wherein said loading platform is adapted to support a load thereon and includes means for producing an air cushion in the space between the load and a base surface below said load to lift said loading platform away from said base surface for transport of said load along said base surface, said steering boxes being positioned within said air cushion with said wheel members in engagement with said base surface for guiding said loading platform as it is transported along said base surface on said air cushion.

4. In combination, a loading platform consisting of a low profile air cushion platform adapted to be selectively moved into the space between a load and a base surface below said load for transporting said load along said base surface, a driving and steering device for said loading platform comprising a plurality of laterally spaced steering boxes arranged within the air cushion under said loading platform, each of said steering boxes including a plurality of wheel members disposed within a ball race, said wheel members being rotatable about horizontal axes and said ball race being rotatable with said wheels as a unit about a vertical axis, whereby said wheel members can be given a rotating movement for driving said loading platform and a turning movement for steering said loading platform, each of said steering boxes including motor means located within said ball race connected to said wheel members and movable with said unit about said vertical axis for selectively rotating said wheel members to drive said loading platform, gear teeth on said ball race, a driving gear in mesh engagement with said gear teeth, a steering system operative to rotate said driving gear thereby to rotate said unit through an angle about said vertical axis to steer said loading platform as it is driven by said wheel members, and means on said loading platform for forcibly pressing said wheel members against said base surface.

5. The structure of claim 4 wherein said last-named means comprises at least one hydraulic piston.

6. In combination, a loading platform, a driving and steering device for said loading platform comprising a plurality of laterally spaced steering boxes arranged under the loading platform, each of said steering boxes including a plurality of wheel members disposed within a ball race, said wheel members being rotatable about horizontal axes and said ball race being rotatable with said wheels as a unit about a vertical axis, whereby said wheel members can be given a rotating movement for driving said loading platform and a turning movement for steering said loading platform, each of said steering boxes including motor means located within said ball race connected to said wheel members and movable with said unit about said vertical axis for selectively rotating said wheel members to drive said loading platform, gear teeth on said ball race, a driving gear in mesh engagement with said gear teeth, a steering system operative to rotate said driving gear thereby to rotate said unit through an angle about said vertical axis to steer said loading platform as it is driven by said wheel members, and a wheeled towing unit connected to said loading platform, said steering system including means operative to coordinate the steering of the towing unit wheels with the rotations of said steering boxes about their respective vertical axes.

7. The structure of claim 6 wherein said loading platform is adapted to support a load thereon and includes means for producing an air cushion in the space between the load and a base surface below said load to lift said loading platform away from said base surface for transport of said load along said base surface, said steering boxes being positioned within said air cushion with said wheel members in engagement with said base surface for guiding said loading platform as it is transported along said base surface on said air cushion.

* * * * *